United States Patent
Harter

(10) Patent No.: US 9,604,367 B2
(45) Date of Patent: Mar. 28, 2017

(54) AREA VACUUM GRIPPER

(71) Applicant: J. Schmalz GmbH, Glatten (DE)

(72) Inventor: Leonhard Harter, Lossburg (DE)

(73) Assignee: J. Schrnalz GmbH, Glatten (DE)

( * ) Notice: Subject to any disclaimer, the term of this patent is extended or adjusted under 35 U.S.C. 154(b) by 0 days.

(21) Appl. No.: 14/763,371

(22) PCT Filed: Jan. 20, 2014

(86) PCT No.: PCT/EP2014/051028
§ 371 (c)(1),
(2) Date: Jul. 24, 2015

(87) PCT Pub. No.: WO2014/114594
PCT Pub. Date: Jul. 31, 2014

(65) Prior Publication Data
US 2015/0360371 A1    Dec. 17, 2015

(30) Foreign Application Priority Data
Jan. 25, 2013   (DE) ........................ 10 2013 201 250

(51) Int. Cl.
*B25J 15/06*   (2006.01)
*B65G 47/91*   (2006.01)

(52) U.S. Cl.
CPC ....... *B25J 15/0616* (2013.01); *B25J 15/0625* (2013.01); *B65G 47/91* (2013.01)

(58) Field of Classification Search
CPC ............... H01L 21/6838; B25J 15/0616; B25J 15/0625; B65G 47/91; B66C 1/02
(Continued)

(56) References Cited

U.S. PATENT DOCUMENTS 4,703,966 A * 11/1987 Lewecke ............... B66C 1/0281
                                                          294/188
4,881,770 A * 11/1989 Marzinotto ............ B65G 47/91
                                                          294/186
(Continued)

FOREIGN PATENT DOCUMENTS

DE          10216221 C1    10/2003
JP           4223943 A      8/1992
(Continued)

OTHER PUBLICATIONS

International Search Report and Written Opinion of the International Searching Authority for Application No. PCT/EP2014/051028 mailed May 6, 2014.
(Continued)

*Primary Examiner* — Stephen Vu
(74) *Attorney, Agent, or Firm* — Howard & Howard Attorneys PLLC

(57) ABSTRACT

A surface area vacuum gripper having a housing with suction openings for sucking a workpiece to be gripped, at least one cover plate that seals the end face of the housing, an insertion element that can be inserted into the housing, wherein the insertion element can be fixed at the cover plate and comprises at least one opening which is flow-connected with the suction openings in the housing, the cover plate comprising a compressed air inlet. The insertion element comprises a functional device for controlling a flow through the opening of the insert.

9 Claims, 1 Drawing Sheet

(58) Field of Classification Search
USPC ........ 294/183, 185, 188, 65; 901/40; 269/21
See application file for complete search history.

(56) References Cited

U.S. PATENT DOCUMENTS

| | | | |
|---|---|---|---|
| 5,076,564 A | | 12/1991 | Marass |
| 5,259,859 A | * | 11/1993 | Claassen ............... C03B 40/005 |
| | | | 294/188 |
| 5,749,614 A | * | 5/1998 | Reid ...................... B65G 47/91 |
| | | | 414/627 |
| 7,661,736 B2 | | 2/2010 | Schmalz et al. |
| 2014/0008929 A1 | | 1/2014 | Cho |

FOREIGN PATENT DOCUMENTS

| | | | |
|---|---|---|---|
| JP | 2012187679 A | 10/2012 | |
| WO | 2012134055 A2 | 10/2012 | |

OTHER PUBLICATIONS

Notice of Reasons for Rejection mailed Oct. 4, 2016 by the Japanese Patent Office for Japanese Patent Application No. 2015-554117.

\* cited by examiner

AREA VACUUM GRIPPER

CROSS-REFERENCE TO RELATED APPLICATIONS

The present application is a National Stage of International Patent Application No. PCT/EP2014/051028, filed on Jan. 20, 2014, which claims priority to and all the benefits of German Patent Application No. 10 2013 201 250.0, filed on Jan. 25, 2013, both of which are hereby expressly incorporated herein by reference in their entirety.

BACKGROUND OF THE INVENTION

1. Field of the Invention

The invention relates to a surface area vacuum gripper having a housing, at least one cover plate that seals the end surface of the housing, an insert element that can be inserted into the housing, wherein the insert element can be attached to the cover plate and has at least one opening that has a flow connection to suction openings in the housing, and the cover plate has a pressurized air inlet, to which a pressurized air supply can be connected.

2. Description of the Related Art

Surface area vacuum grippers are constructed in the known manner, such that the necessary valves for controlling a vacuum generator, e.g. an ejector, are placed externally on the housing or the cover plate. The same applies for valve devices for generating pressurized air jets for cleaning the workpiece. Surface area vacuum grippers of this type are relatively difficult to retrofit to other vacuum generators. Furthermore, externally placed control valves take up space and are exposed to the risk of damage.

SUMMARY OF THE INVENTION

The present invention overcomes the disadvantages of the related art in a reliably operable surface area vacuum gripper, which can be easily retrofitted for operation with other vacuum generators or for other functions.

More specifically, the present invention is directed toward a surface area vacuum gripper having a housing with suction openings for applying suction to a workpiece that is to be gripped. At least one cover plate seals the front surface of the housing. An insert element can be inserted into the housing, wherein this element can be attached to the cover plate and has at least one opening that has a flow connection to the suction openings. The cover plate has a pressurized air inlet. At least one control valve is integrated in the cover plate and the insert element includes a functional device for controlling a flow through the opening in the insert element.

The surface area vacuum gripper according to the invention has a modular design and comprises a cover plate that can be implemented universally, onto which the insert element having the functional device can be attached, in particular, can be releasably attached, or is releasably mounted. In order to retrofit the surface area vacuum gripper, only the cover plate need be removed from the housing, and the insert element exchanged. The cover plate is preferably also releasably attachable to the housing.

Depending on the design of the functional device of the insert element, the surface area vacuum gripper can be used for an internal vacuum generation, or can be used for connecting to an external generation of a vacuum.

Because the control valves are integrated in the cover plate, they are available for all forms of application. In this regard, the cover plate preferably has at least one control valve for controlling the functional device provided in the insert element. In particular, at least one shut-off device for the pressurized air inlet is integrated in the cover plate.

As a result of the modular design, an economical retro-fitting of the surface area vacuum gripper to other functions, or other vacuum supply devices, respectively, is possible. The integrated control units in the cover plate can be used for the internal vacuum generation, or for connecting and disconnecting the connection to an external vacuum generation.

The functional device is preferably a vacuum generator (in particular for generating a vacuum in the opening in the insert element), and/or a shut-off device for an opening in the insert element.

The insert element preferably has an insert housing that is separate from the housing for the surface area vacuum gripper, in which insert housing the functional device is accommodated. Therefore, for the retrofitting, the insert element can be exchanged as a compact module. It is also conceivable, however, that the functional device is attached, or mounted, directly, in particular without a housing, on the cover plate. In this way, spatial requirements can be reduced.

BRIEF DESCRIPTION OF THE DRAWINGS

Other advantages of the invention will be readily appreciated as the same becomes better understood by reference to the following detailed description when considered in connection with the accompanying drawings, wherein.

DETAILED DESCRIPTION OF THE INVENTION

Figure 1:
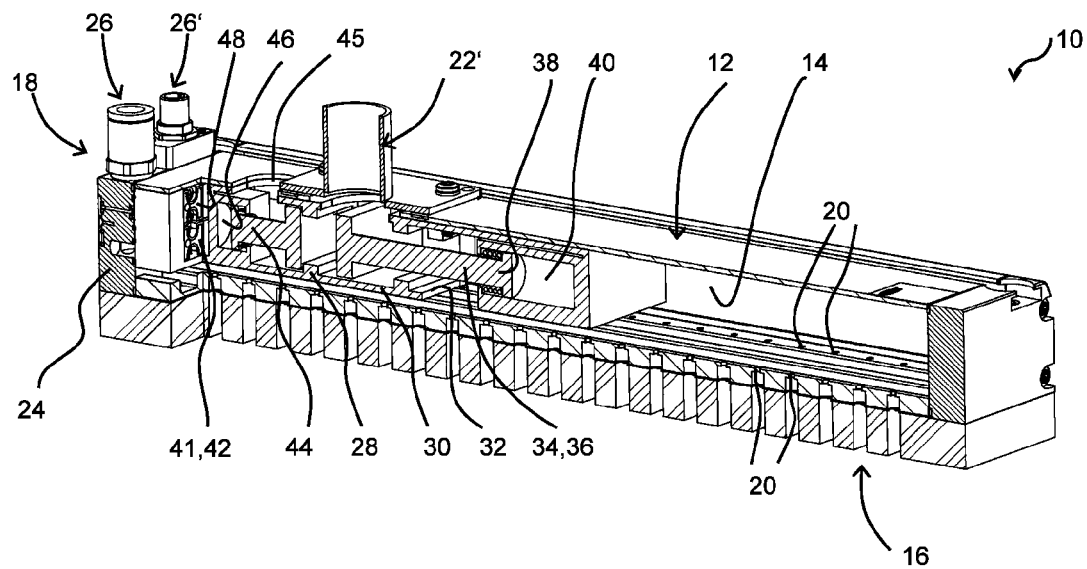
FIG. 1 shows a longitudinal section, cut through a surface area vacuum gripper according to the invention.

The surface area vacuum gripper of the present invention is generally indicated at 10 in the figures, where like reference numerals are used to identify like structure throughout the drawings. The surface area vacuum gripper 10 has a substantially box-shaped housing 12 in the depicted example, which is depicted in FIG. 1 in a longitudinal section. The housing 12 delimits a suction chamber 14 in its interior, and has a suction side 16, to which a workpiece, not shown, can be applied and suctioned onto when the surface area vacuum gripper is in operation. The housing 12 has an end surface 18 differing from the suction side 16, formed by a narrow side of the box-shaped housing 12 in the depicted example. The housing 12 has numerous suction openings 20, which pass through the suction side 16 in the depicted example, and thus form a flow connection to the suction chamber 14.

The surface area vacuum gripper 10 depicted in FIG. 1 is designed to be operated with an external vacuum supply. Thus, the housing 12 has a vacuum supply connection 22, which can, for example, have an appropriate adaptor for connecting to a vacuum hose. The front end 18 of the housing 12 is closed with a preferably releasably mounted cover plate 24. The cover plate 24 has a pressurized air inlet 26 in the depicted example, which can serve for connecting to a pressurized air supply and, for example, can have appropriate connection adapters. Numerous pressurized air inlets can also be provided.

An insert element 28 is disposed in the interior space encompassed by the housing 12, which is designed in the manner of an insertion module having its own insert housing 30 in the depicted example. The insert housing 30 is inserted into the housing 12 of the surface area vacuum gripper 10 and mounted on the cover plate 24. The attachment of the insert element to the cover plate 24 is preferably releasable, such that the insert element 28 can be exchanged in order to retrofit the surface area vacuum gripper 10.

Fundamentally, the insert element 24 serves to control the flow through the suction openings 20 when the surface area vacuum gripper is in operation, and thus influence the functions of the surface area vacuum gripper. In order to apply a suction to a workpiece at the end surface 18, air is suctioned in through the suction openings 20 due to a vacuum prevailing in the suction chamber 14. In order to be able to release the workpiece in a controlled manner from the end surface 18, the suction can be suspended, or a blow jet in the form of a flow from the suction chamber 14 through the suction opening 20 can be implemented.

The insert element 28 has at least one opening 32, which opens into the suction chamber 14, and is thus in a flow connection with the suction openings 20 in the housing 12 of the surface area vacuum gripper 10. The insert element 28 comprises a functional device 34, by which the flow through the opening 32 in the insert element 28, and thus the flow through the suction openings 20 as well, can be controlled. In the embodiments illustrated in FIG. 1, the functional device 34 includes a piston-like shut-off device 36, which can be displaced between a suction position and a closed position in the insert element 28. In the suction position, the vacuum supply connection 22 has a flow connection to the opening 32 of the insert element 38 through the insert element 28, such that air can be suctioned off through the suction openings 20 in the suction chamber 14, through the opening 32, and lastly through the vacuum supply connection 22. In the closed position, the flow connection between the vacuum supply connection 22 and the opening 32 in the insert element 28 is interrupted.

In the embodiment illustrated in FIG. 1, the shut-off device 36 of the functional device 34 can be controlled pneumatically. To this end, the shut-off device 36 has a control piston section 38, which delimits a control chamber 40, which can be subjected to pressurized air in order to displace the shut-off device 36 between the closed position and the suction position. To this end, the control chamber 40 is connected by a connecting channel, which is not shown in the section of FIG. 1, which passes through the insert element 38 toward the end surface 18, to a pressurized air outlet 41 in the cover plate, or a control valve 42 integrated in the cover plate 24, respectively. A flow connection to a pressurized air inlet 26 can be established by the control valve 42. In turn, the control valve 42 can have a shut-off device, e.g. a displaceable control piston. In one embodiment, the control valve 42 can be a 3-2 way valve. The shut-off device can be electrically controllable, wherein an appropriate control connection 26' can likewise be disposed on the cover plate 24.

The functional device 34 also includes a piston-like shut-off device 44, which can be displaced between a neutral position and an aeration position in the insert element 28. In the aeration position, a flow connection can be established between the vacuum supply connection 22 and an aeration opening 45 in the surface area vacuum gripper 10, to the environment for example. In the neutral position, this flow connection is preferably interrupted. This design makes it possible to establish a flow connection from the aeration opening 45 to the vacuum supply connection 22, when the first shut-off device 36 is closed, such that it can suction in the connected external cooling air, and thus prevent an overheating. The other shut-off device 44 can also be pneumatically controlled, by a control chamber 46, for example, which can be subjected to pressurized air in a controlled manner by another control valve 48 on the cover plate 24.

Figure 2:
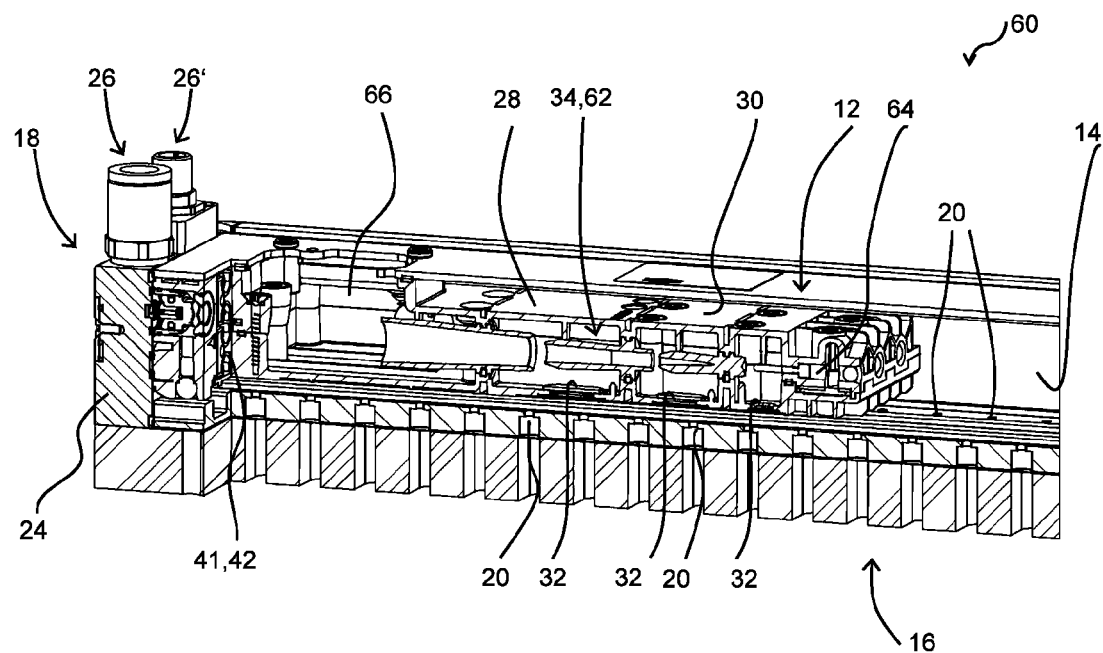
FIG. 2 shows another embodiment of a surface area vacuum gripper according to the invention, in a longitudinal section.

FIG. 2 illustrates another embodiment of the surface area vacuum gripper of the present invention, designated at 60. The surface area vacuum gripper 60 illustrated in FIG. 2 differs from the surface area vacuum gripper shown in FIG. 1 substantially by the design for the functional device 34 of the insert element 28. The functional device 34 includes a vacuum generator 62 operated by pressurized air here, which is designed in the depicted example as a three-step ejector having three successive power nozzles, or receiver nozzles, respectively. A distributer chamber 64 is formed in the insert element 28, which has a flow connection to a corresponding pressurized air inlet and to the outlet of a control valve 42 of the cover plate 24 via connecting channel, which is not shown in the section shown in FIG. 2. As a result, the distributer chamber 64 can be supplied in a controlled manner with pressurized air from the pressurized air inlet 26 via the control valve 42. The nozzles of the ejector 62 are supplied in a fundamentally known manner via the pressurized air introduced into the distributer chamber 64, such that air can be suctioned off through the numerous openings 32 in the insert element 28. The insert element 28 furthermore has an air discharge opening 66, which is connected to the environment via a corresponding opening in the housing 12, such that the exhaust from the ejector 62 can be discharged. The functional state of the ejector 62 can thus be controlled by the control valve 42 in a controlled manner.

A fundamental advantage of the modular construction, having the cover plate 24 and the insert element 28, is that by exchanging the insert element 28, it is possible to retrofit the surface area vacuum gripper. In particular, the same cover plate 24, having its integrated control valves 42 can be used, fundamentally, for controlling a surface area vacuum gripper having an external vacuum supply (cf. FIG. 1) or for operation with an integrated vacuum generator (cf. FIG. 2).

Those having ordinary skill in the art will appreciate that the functional device 34 can also be designed, with all embodiments, such that a connection between the opening 32 and a pressurized air inlet 26 can be created via a corresponding shut-off device, in a controlled manner, such that, in order to release a workpiece retained by the suction, a pressurized air jet can be generated through another opening in the insert element 28, and thus through the suction opening 20. Preferably, this shut-off device can also be controlled via a corresponding control valve (in the manner of the control valve 42 or 48) in the cover plate.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

What is claimed is:

1. A surface area vacuum gripper having a housing with a suction side and a front end, wherein the suction side comprises suction openings for applying suction to a workpiece that is to be gripped, at least one cover plate that seals the front end of the housing, an insert element that can be inserted into the housing, wherein the insert element can be attached to the cover plate and has at least one opening that has a flow connection to the suction openings, and wherein the cover plate has a pressurized air inlet, wherein at least one control valve is integrated in the cover plate, and wherein the insert element includes a functional device for controlling a flow through the opening in the insert element.

2. The surface area vacuum gripper as set forth in claim 1, wherein the functional device comprises a piston shut-off device for the at least one opening in the insert element, or wherein the functional device comprises a vacuum generator configured to be operated by pressured air.

3. The surface area vacuum gripper as set forth in claim 1, wherein the insert element has its own insertion housing, in which the functional device is accommodated.

4. The surface area vacuum gripper as set forth in claim 1, wherein the at least one control valve is configured to shut off the pressurized air inlet.

5. The surface area vacuum gripper as set forth in claim 4, wherein the control valve for the pressurized air inlet can be activated electrically.

6. The surface area vacuum gripper as set forth in claim 1, wherein the control valve for the pressurized air inlet is a 3-2 way valve.

7. The surface area vacuum gripper as set forth in claim 1, wherein the cover plate comprises a pressurized air outlet.

8. The surface area vacuum gripper as set forth in claim 7, wherein a pressurized air outlet of the cover plate is connected to a distributor chamber providing inlet of pressurized air for a vacuum generator of the functional device.

9. The surface area vacuum gripper as set forth in claim 7, wherein the functional device comprises a shut-off device which is configured to be controlled pneumatically, wherein the shut-off device comprises a control piston section which delimits a control chamber, wherein the pressurized air outlet is connected to the control chamber.

* * * * *

UNITED STATES PATENT AND TRADEMARK OFFICE
CERTIFICATE OF CORRECTION

PATENT NO.        : 9,604,367 B2
APPLICATION NO.   : 14/763371
DATED             : March 28, 2017
INVENTOR(S)       : Leonhard Harter Page 1 of 1

It is certified that error appears in the above-identified patent and that said Letters Patent is hereby corrected as shown below:

Item (73) Assignee: delete "Schrnalz" and insert therefor --Schmalz--.

Signed and Sealed this
Thirteenth Day of June, 2017

Joseph Matal
*Performing the Functions and Duties of the
Under Secretary of Commerce for Intellectual Property and
Director of the United States Patent and Trademark Office*